Figure 1:
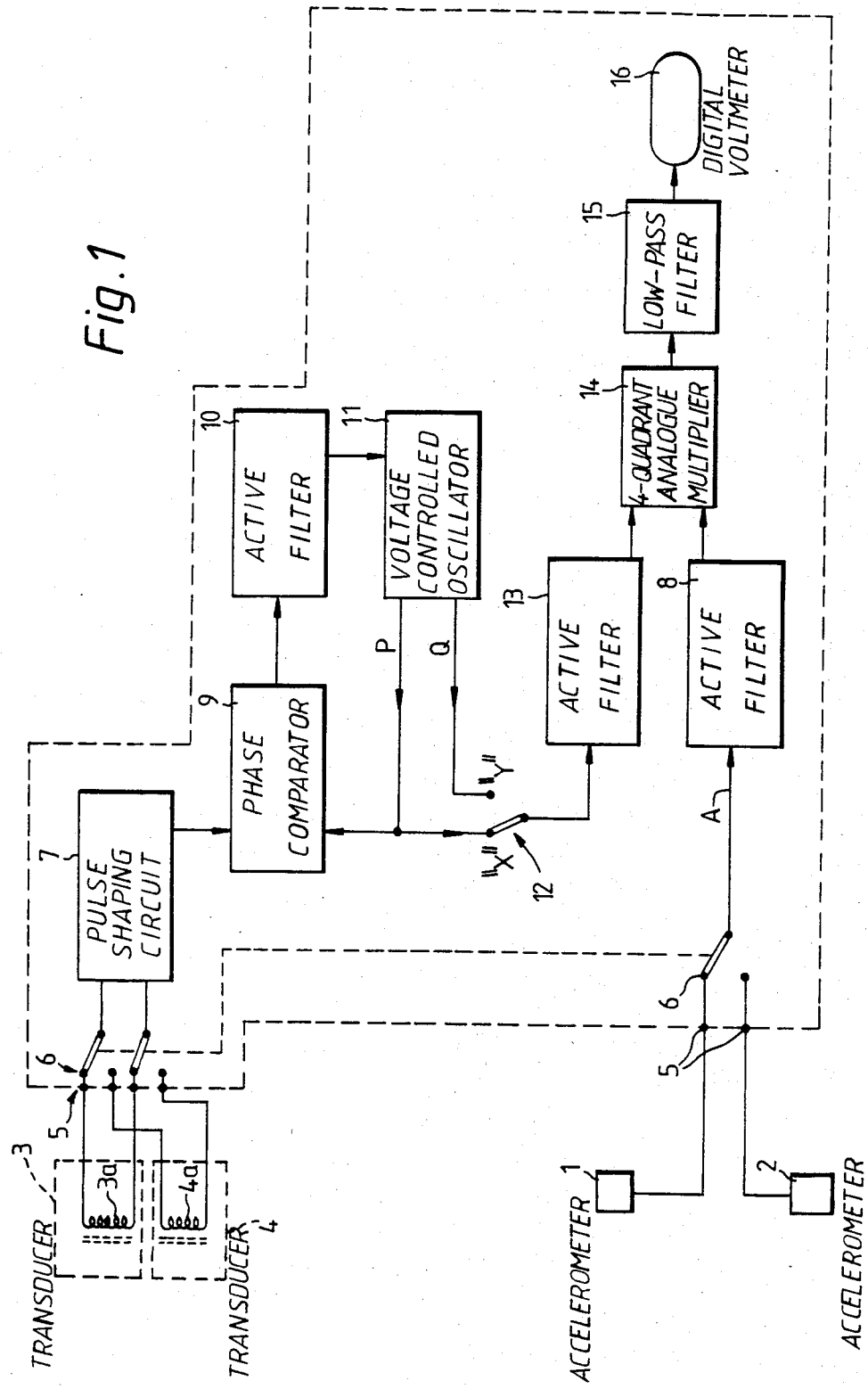

United States Patent [19]

Widdall

[11] Patent Number: 4,513,619
[45] Date of Patent: Apr. 30, 1985

[54] TESTING THE BALANCE OF A ROTATABLE MEMBER

[75] Inventor: John A. Widdall, Woodford, England

[73] Assignee: British Aerospace Public Limited Company, London, England

[21] Appl. No.: 457,392

[22] Filed: Jan. 12, 1983

[30] Foreign Application Priority Data

Jan. 13, 1982 [GB] United Kingdom ............... 8200904

[51] Int. Cl.³ ............................................. G01M 1/22
[52] U.S. Cl. ...................................... 73/455; 73/457; 73/462
[58] Field of Search ................. 73/455, 457, 462, 463, 73/464

[56] References Cited

U.S. PATENT DOCUMENTS 2,362,842 11/1944 Mueller ................... 73/455
3,038,342  6/1962 Hack ...................... 73/462
3,678,761  7/1972 Blackburn ................ 73/464
4,298,948 11/1981 Davis .................... 73/462 X Primary Examiner—James J. Gill
Attorney, Agent, or Firm—Cushman, Darby & Cushman

[57] ABSTRACT

Asymmetries of rotatable members such as aircraft propellers can be balanced out by the careful addition of counterweights at proper positions on the members. An accelerometer coupled to the mounting of an unbalanced rotating member produces a signal containing a component indicative of the unbalance. This signal would be useful for helping in the balancing process but it may also contain noise components from which the useful component has to be extracted without too much alteration. A fixed frequency band-pass filter could be used but the results then have to be manually corrected if the actual frequency varies from that associated with the filter or a manually turnable filter could be used but then of course the filter has to be tuned for each test. Herein there is proposed the extraction from the accelerometer signal (A) of respective signals indicative of quadrature components of the useful part of the accelerometer signal by multiplying the accelerometer signal with respective rotatable member position indicative signals (P, Q) derived by a phase-locked loop arrangement (9, 10 and 11).

3 Claims, 5 Drawing Figures

TESTING THE BALANCE OF A ROTATABLE MEMBER

This invention relates to a method and apparatus for testing the balance of a rotatable member such as an aircraft propeller.

An out-of-balance aircraft propeller acts something like a balanced propeller with an added out-of-balance mass in the propeller blade plane. As the blade rotates, the moment of the out-of-balance mass about the axis of rotation results in the engine driving the propeller being subjected to a radial force of which the direction rotates about the propeller axis at the same speed as the propeller.

Assuming (quite reasonably) that the engine is not rigidly mounted, it will move in response to this force and it has been proposed to couple an accelerometer to the engine to measure this movement and thereby derive the necessary position and value of a counterweight to be fixed to the propeller to balance it.

Ideally, the accelerometer would produce a nice noise-free sinusoidal signal of which the amplitude is proportional to the engine movement and hence to the out-of-balance moment and the required mass of the counterweight, and of which the phase angle relative to the propeller rotation gives the required counterweight position.

In practice, factors such as asymmetry of the engine mounting stiffness (which means that the force exerted on the engine does not result in a purely circular engine movement) and the possible presence of a non-zero damping term in the equation of motion of the engine mass on its supporting structure may introduce phase-errors into the accelerometer signal. These errors may be tolerable or, since they will generally be constant, at least for a particular engine or aircraft, it may be possible to cancel them out by means of a fixed phase-shift adjustment.

However, there is a further problem in that there are several factors producing vibration of the engine and so the accelerometer signal will comprise several frequency components. For example, the signal from an accelerometer coupled to an engine of one British Aerospace 748 turboprop aeroplane with its four-bladed propeller rotating at twenty-two revolutions per second comprised the desired 22 Hz "out-of-balance" component but, in addition, a large component at about 10 Hz due perhaps to structural resonance, another at 88 Hz due to aerodynamic interaction between each propeller blade and the ground or fuselage and considerable noise in the range 1 to 5 KHz due to the engine itself.

The 22 Hz component must therefore be extracted from the total accelerometer signal but the extraction must be such that the phase and amplitude of the component still carries the required information with sufficient accuracy. It has been proposed to use a fixed frequency band pass filter to extract the wanted signal component but then the resultant information has to be manually corrected by reference to a phase shift versus frequency graph for the filter. A manually tunable bandpass filter has also been proposed but then of course the filter has to be tuned for each test. One object of the invention is to provide an alternative means of extracting the out-of-balance representing component of the accelerometer signal.

However, it will be appreciated that the problem described above does not necessarily only arise in connection with the balancing of an aircraft propeller but also in connection with the balancing of other rotatable members.

According to one aspect of the invention, there is provided a method of investigating the balance of a rotatable member, for example a propeller of a propeller driven aircraft, the method comprising rotating the member, forming first and second electrical signals of which the first is representative of the rotational position of the member and of which the second contains a component which is representative of force generated in a direction radial to the axis of rotation of the member due to the presence of any unbalanced mass component of the member, multiplying said signals together and measuring the average value of the resultant signal.

According to a second aspect of the invention, there is provided apparatus for investigating the balance of a rotatable member, the apparatus comprising input means for receiving an electrical signal containing a component representative of force generated in a direction radial to the axis of rotation of the member and hence containing a component due to the presence of any unbalanced mass component of the member, signal deriving means for supplying a sinusoidal position indicating signal having a constant predetermined phase relative to the rotation of said member, multiplying means for multiplying said force representative signal and said position indicating signal together, and average value measuring means for measuring the average value of the resultant signal from the multiplying means.

The signal deriving means may comprise a terminal for receiving a train of signals each indicative of the movement of the member through a predetermined point in its rotation and a phase-locked loop arrangement which is coupled to said terminal and is operable for generating a sinusoidal signal and for maintaining the phase of this signal locked to that of said train of signals Advantageously, the signal deriving means is operable for supplying a further sinusoidal position indicating signal having a predetermined constant phase relationship to the first-mentioned position indicating signal, and the apparatus includes switch means for selecting the first-mentioned or the further position indicating signal for transfer to said multiplying means.

Figure 2:
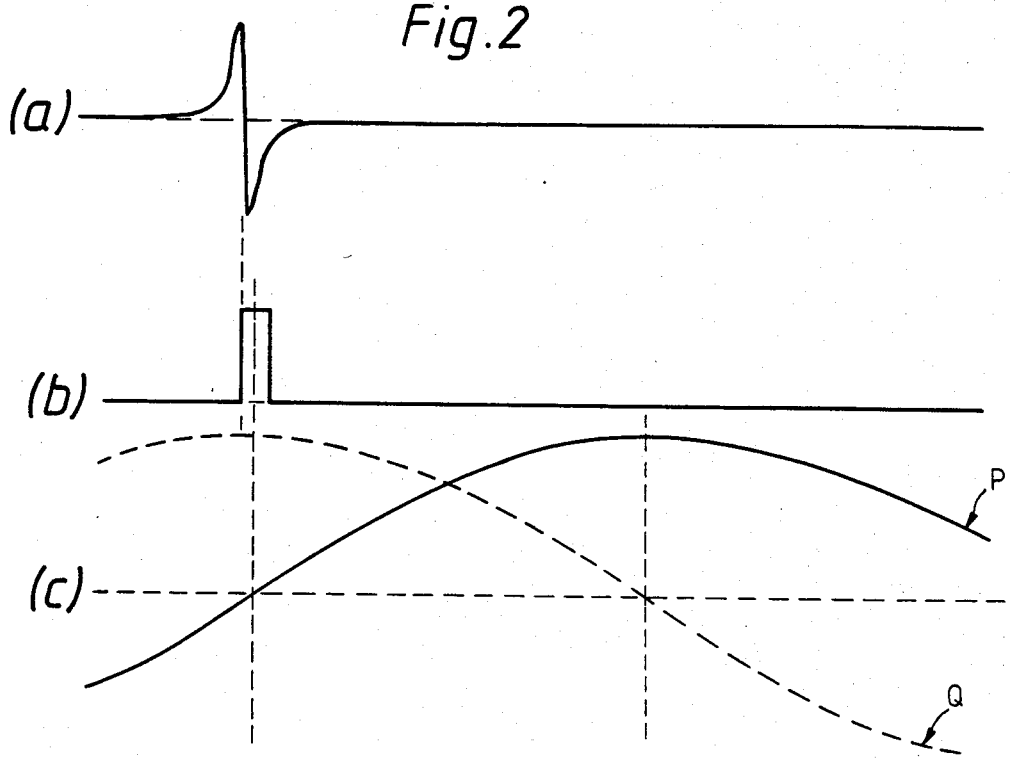
Figure 3:
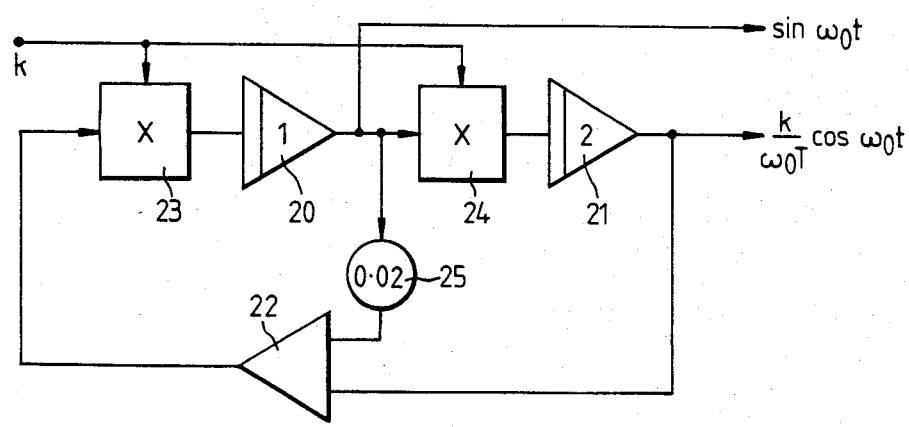
Figure 4:
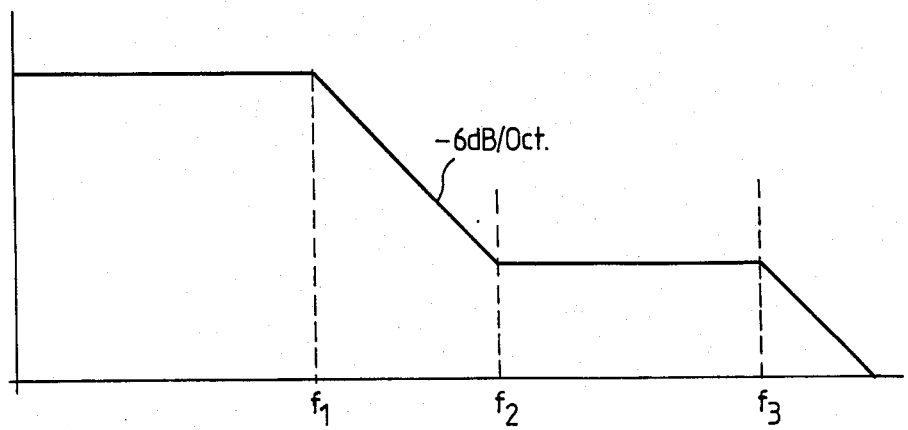
Figure 5:
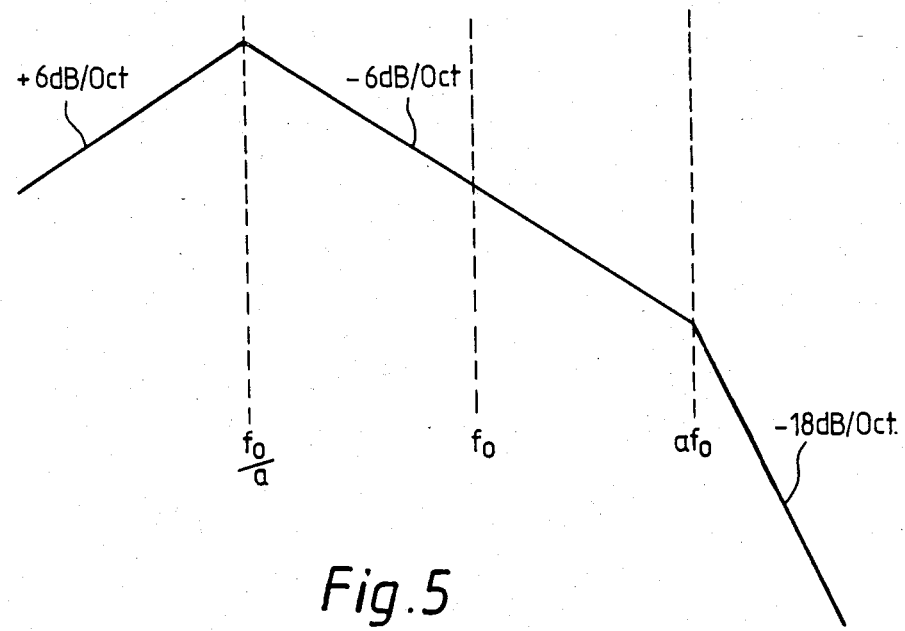

For a better understanding of the invention reference will now be made, by way of example, to the accompanying drawings, in which:

FIG. 1 is a simplified circuit diagram of a propeller balancing test set for a two-engine turboprop aircraft, the figure also showing two accelerometers and two position transducers used in conjunction with the test set, FIG. 2 is a diagram showing the form of some signals produced in the arrangement of FIG. 1, FIG. 3 is a simplified circuit diagram of a two-phase voltage controlled oscillator (VCO) used in the FIG. 1 test set, FIG. 4 is a diagram illustrating the frequency characteristic of an active filter used in the FIG. 1 test-set and FIG. 5 shows the frequency characteristic of each of two other active filters of the test set.

In the apparatus to be described, two sinusoidal signals P and Q are formed having a constant predetermined phase relationship with the rotation of a propeller to be balanced and being in phase quadrature relative one to another. The two signals thus correspond to respective orthogonal axes x and y within the propeller plane and radial to the axis of rotation of the propeller. A selected one of these signals and the signal from an accelerometer coupled to the engine driving the propeller are processed within the apparatus, the processing including multiplying the two signals together and then taking the average value of the resultant.

The accelerometer signal A may be expressed as a Fourier expansion in the form:

$$a_1 \sin Wt + b_1 \cos Wt + a_2 \sin 2Wt + b_2 \cos 2Wt + \cdots +$$
$$a_n \sin nWt + b_n \cos nWt + \cdots + e(t)$$

where W is the nominal signal frequency corresponding to the speed of rotation of the propeller, say 22 Hz, and where e(t) represents noise. If the signal P comprises sin Wt and this signal is selected and multiplied with signal A, then the resultant is:

$$a_1 \sin^2 Wt + b_1 \sin Wt \cos Wt +$$
$$a_2 \sin Wt \sin 2Wt + b_2 \sin Wt \cos 2Wt + \cdots +$$
$$a_n \sin Wt \sin nWt + b_n \sin Wt \cos nWt + \cdots +$$
$$\sin Wt \cdot e(t).$$

The only term here having a non-zero average value is $a_1 \sin^2 Wt$, i.e.

$$\overline{AP} = \overline{a_1 \sin^2 Wt} = \tfrac{1}{2} \cdot \overline{(1 - \cos 2Wt)} \, a_1 = \tfrac{1}{2} \cdot a_1$$

Thus, the signal processing gives a reading of the amplitude of the 22 Hz component of signal A in phase with signal P, this reading being representative of the out-of-balance moment of the propeller along the x-axis. Correspondingly, when signal Q (cos Wt) is selected and multiplied with A, the average value of the multiplied signals is $\tfrac{1}{2} \cdot b_1$, thus giving a reading of the out-of-balance moment along the y-axis.

It will be appreciated that if P and Q are not pure sine waves then the result of the multiplication will contain harmonics which produce errors in the average value readings.

Referring now to FIG. 1, the illustrated test set is used in conjunction with two accelerometers 1 and 2 which provide respective . . . signals indicative of the vibration of the port and starboard aircraft engines (not shown) and two position transducers 3 and 4 which provide respective trains of signals, the signals of each train coinciding with successive movements through a particular point in its rotation of a respective one of the port and starboard propellers (not shown). By way of example, each of the transducers 3 and 4 may comprise a small permanent magnet (not shown) attached to the inner surface of a propeller spinner-assembly rear flange (not shown) and a pick-up coil 3a, 4a fixed within the rear flange so that the magnet moves past the coil and induces a signal therein once in each revolution of the propeller. A counterweight may need to be attached to the rear flange inner surface opposite the permanent magnet to balance the latter.

The signals from the accelerometers and transducers 1 to 4 are received at test-set input terminals 5 which lead to a manually operable ganged selector switch arrangement 6 for choosing the signals from either the port or the starboard engine. The chosen transducer signal is passed to a pulse shaping circuit 7 while the chosen accelerometer signal is passed to an active filter 8.

Assuming that each transducer 3 and 4 comprises the aforementioned magnet and pick-up coil, each signal therefrom will comprise a current impulse of one polarity, as the magnet moves towards the coil, followed immediately by an impulse of opposite polarity as the magnet moves past and away from the point of maximum influence on the coil as shown at (a) in FIG. 2. Thus, the shaping circuit 7 may then comprise a differential amplifier arranged to sense the fast zero-crossing between the two impulses and a monostable circuit responsive to the amplifier to give out a fixed length datum pulse of which the leading edge coincides with the zero-crossing as shown at FIG. 2b.

The train of datum pulses from the shaping circuit 7 are passed to a phase-comparator 9 forming part of a phase-locked loop arrangement which further comprises an active filter 10 and a voltage controlled oscillator 11 and of which the function is to produce phase and quadrature sinusoidal waveforms P and Q (as shown at FIG. 2c) having fixed phase relationships to the datum pulses and hence to the propeller rotation. The waveforms P and Q are formed by the oscillator 11, waveform P being fed back to the phase-comparator 9 which, in fact, comprises a sampling circuit and is operable to sample waveform P for the duration of each datum pulse from circuit 7. The mean level of the comparator output is thus dependent upon the sine of the P waveform phase angle during the sampling periods and, at least for small values of this angle, varies reasonably linearly. The filtered output of the comparator controls the frequency of the oscillator whereby, as a whole, the loop tends to maintain the oscillator phase fixed with respect to the datum pulses. A proportion of the quadrature signal may be added to the output of the comparator, for example by means of a presettable potentiometer (not shown), to set the regulated phase angle, and hence, in effect, set up the desired orientation of the x and y reference axes.

As shown in FIG. 3 the voltage controlled oscillator includes a regenerative loop comprising a series arrangement of two active inverting integrators 20 and 21 and an inverting adder 22. The control voltage k received from comparator 9 via filter 10 is applied to one input of each of two analogue multipliers 23 and 24. The other input of multiplier 23 receives the output of inverting adder 22 while its output is connected to the input terminal of integrator 20. The other input of multiplier 24 is connected to the output terminal of integrator 20 while its output is coupled to the input terminal of integrator 21. The sine output signal P, equal to $\sin W_o \cdot t$ where $W_o = k/T$ and T is the time constant of each integrator, is taken from the output terminal of integrator 20 while the cosine output signal Q, equal to $\cos W_o \cdot t$ is taken from the output terminal of integrator 21. Additional feedback giving a "negative damping" effect is obtained by a small portion of the signal P, say 0.02 P being taken off by divider 25, a simple potentiometer say, to a second input of adder 22 to ensure maintenance of oscillation. The oscillation amplitude is kept constant by a soft-limiting network (not shown) of resistors and diodes coupled to the integrator 20.

The integrators 20 and 21 may be provided with adjustable time constants which are set to the desired value T during setting-up of the oscillator.

The filter 10 is a low-pass filter with its gain and bandwidth carefully selected to give an adequate stability margin to the dynamic response of the phase-locked loop. By way of example, the filter response may have the shape illustrated in FIG. 4.

The signal k applied to the oscillator 11 may be amplitude limited at a maximum level for which the oscillator frequency is just above the normal operating range, the object being to reduce the chance of the phase-locked loop locking on to a harmonic of the datum pulse waveform.

With the arrangement shown, the loop gain at zero frequency, i.e. in the locked condition, is finite so that a zero error is always present. However, this can be made acceptably small by making the closed loop gain high.

Referring again to FIG. 1, one of the waveforms P and Q is selected by switch 12 in dependence upon whether the x or y component of the out of balance vector is to be measured and passed on to a part of the test set which, since it performs a partial Fourier analysis of the signal from the selected accelerometer, may be called the analyser. The analyser comprises the aforementioned active filter 8, an active filter 13 which receives the oscillator signal selected by switch 12, a four quadrant analogue multiplier 14, a low-pass filter 15 and a digital voltmeter 16.

Assuming that the signal P or Q selected by switch 12 is sinusoidal and of constant amplitude, the voltmeter 16 is operable to indicate the polarity and amplitude of the x or y component present in the accelerometer signal, which particular component being dependent upon which of the signals P and Q has been selected.

The active filter 8 is designed to have a frequency response which is effectively that of a perfect integrator combined with a bandpass filter as shown in FIG. 5 where the centre frequency $f_o$ is the frequency of propeller rotation normally to be used for the balancing test, 20 Hz say, and where the integer a might be say five. This filter is provided with a variable gain which is adjusted by a 10-turn potentiometer (not shown) with a locking dial mounted on the front panel of the test set. On the actual test, the gain is adjusted during the first engine run to be as high as possible without clipping of the signal (at the filter output) as indicated say by a flashing light-emitting diode on the front panel. Saturation of the amplifier in the filter or of the multiplier input, must be avoided or the resultant voltmeter readings will be in error. It may be possible to discard the gain control and overload indicator if the gain of the filter is set to a generally applicable "safe" value. For some applications, it might then be possible to scale the voltmeter to read directly in "mass units". However, for aircraft propeller balancing, in relation to which it may be found that there is a wide variation in apparent stiffness of different engine mountings, it may well be preferable not to rely on any direct scaling and instead to include two calibration runs in the balancing procedure for each propeller, each run being made with a known out-of-balance mass affixed in respective positions on the propeller. These calibration runs allow the voltmeter to be scaled for the particular engine, and its mounting, to which the propeller is coupled and then the balancing procedure proper may be carried out.

Filter 13 is designed to have a frequency response exactly like that of filter 8 but with fixed gain.

One object of filter 8 is to attenuate unwanted noise components before they reach the multiplier 14. (This is only necessary to ensure that the multiplier input is not overloaded—provided the noise components are within the normal range of multiplier inputs they do not effect the final output). By making the response of filter 13 identical, the effect of phase shifts due to the bandpass characteristics are exactly cancelled and, at or near the normal operating frequency, the two filters may be regarded as perfect integrators.

A second function is a consequence of the double integration. In the absence of structural resonances the output of the accelerometer, for a given out of balance mass, would be proportional to $W^2$ (where W is the rotation frequency of the propeller). This signal integrated once results in the component at frequency W being proportional to W.

i.e. $\int mrW^2 \sin(Wt+\phi) \, dt = -mrW \cos(Wt+\phi)$

Integration of the constant amplitude output of the VCO produces a signal proportional to 1/W. The mean value of the multiplier output and hence the voltmeter reading is therefore independent of W, the rotation frequency. In practice this will be true if the rotation frequency is far enough away from structural resonances. All measurements taken in balancing a particular propeller should therefore be made at the same frequency (i.e. the same engine speed.)

It is the d.c. component of the multiplier output which is of interest, hence the low-pass filter 15 inserted before the voltmeter. This is designed in conjunction with the voltmeter specification so that a.c. components presented to the voltmeter are acceptably low.

For convenience, an aircraft may comprise built-in connector leads extending between a connector device near the or each engine and a further connector device in the cockpit or cabin. Then, during servicing, a test set as described herein may be temporarily coupled to the cabin or cockpit connector device, and an accelerometer and position transducer coupled to each engine and the engine connector device. Possibly, the position transducer may be already installed as a permanent part of the aircraft control system—for example it may form part of an engine synchrophasing system as described in our U.K. patent application No. 8214009 filed May 13, 1982 and published Jan. 12, 1983 under No. 2,101,363A. By arranging for the signals P and Q to have phase correspondence with respective radial directions in the plane of the propeller, along which directions the propeller or part of the spinner assembly is provided with means for receiving counterweights (e.g. threaded holes for allowing one or more washers to be bolted on) and by properly calibrating the test set, e.g. by measuring the differences between series of test set readings for a particular propeller with different known unbalancing weights attached thereto, it may be possible to arrange that the digital voltmeter gives a direct reading of the amount of mass, e.g. as a number of the aforementioned washers, to be added to or subtracted from the relevant counterweight receiving position. On the other hand, as mentioned earlier herein, it may well be better in some situations not to try to calibrate the voltmeter for any general case but instead to carry out meter calibration runs each time a propeller is balanced.

A full mathematical analysis of the propeller balancing arrangement and procedure described herein will lead to the realisation that, due to factors such as the coupling of the accelerometer to the engine while the out-of-balance forces are generated in the propeller plane and hence reach the accelerometer via the propeller shaft, engine bearings and so on, the arrangement and procedure leads to the achievement of neither static nor true dynamic balancing of the propeller. Rather it achieves some approximation of dynamic balance. However, since the procedure involves measuring and subsequent reduction or even nulling of engine movement or vibration and hence the bearing transmitted forces and since the object of balancing the propeller is in fact to reduce those very parameters, it does not really matter what kind of balancing is achieved. For applications other than propeller balancing on an aircraft, the nature and position of the accelerometer or whatever other force transducer is used will of course be chosen to suit the application and, if desired, the choice may take account of the kind of balancing to be carried out.

FIGS. 4 and 5 each comprise a plot of attenuation in Decibels against the logarithm of frequency. In FIG. 4, the section of the plot marked −6 dB/Oct has a slope of −6 decibels per octave. Correspondingly, in FIG. 5, the two sections marked +6 dB/Oct and −6 dB/Oct respectively have slopes of +6 decibels per octave and −6 decibels per octave while the section marked −18 dB/Oct has a slope of −18 decibels per octave.

I claim:

1. Apparatus for determining the amount and location of unbalance of an aircraft propellor, the apparatus comprising:

rotation sensor means, positioned near said propellor, for forming a train of pulses each indicative of movement of the propellor through a predetermined point in its rotation;

phase-locked voltage-controlled oscillator means, connected to receive said train of pulses, for forming first and second sinusoidal reference signals which are both locked in phase to said train of pulses and between which there is a phase-difference of substantially ninety degrees, the phase-locked oscillator means comprising regenerative feedback loop means incorporating an active inverting integrator, two reference signal output terminals respectively coupled to the input and output sides of the active inverting integrator, and phase-comparator means, having two inputs respectively connected to receive a portion of the signal formed at one of said signal output terminals and said pulse train, for forming an error signal indicative of phase error between said signal portion and said pulse-train, the output of the phase-comparator means being coupled to said regenerative feedback loop means for injecting said error signal into the regenerative feedback loop means;

accelerometer means, positioned on said aircraft, for generating a vibration signal indicative of radial force produced as a result of unbalanced mass components of the rotating propellor;

selector switch means connected to said two reference signal output terminals of the oscillator means and operable for enabling one of the two reference signals to be passed to an output of the selector switch means;

multiplying means, connected to said accelerometer means and said selector switch means, for multiplying the vibration signal and the selected reference signal together; and average value measuring means, connected to the multiplying means, for measuring the average value of its output.

2. Apparatus according to claim 1, wherein said regenerative feedback loop means includes two active inverting integrators and an active inverter connected in series, a first multiplier element connected between the output of the active inverter and the input of one of said active inverting integrators, and a second multiplier element connected between the output of said one of the two active inverting integrators and the input of the other active inverting integrator, each multiplier element being also connected to receive said error signal from said phase-comparator means.

3. Apparatus according to claim 1, including two active filters having substantially identical frequency responses and operable to act as integrators, one of the filters being connected between said accelerometer means and said multiplying means and the other being connected between the output of said selector switch means and said multiplying means.

* * * * *